United States Patent
Berger, Jr. et al.

[11] 4,052,316
[45] Oct. 4, 1977

[54] COMPOSITE COALESCING FILTER TUBE

[75] Inventors: Leo Joseph Berger, Jr., Birmingham; Denis D. Guequierre, Livonia, both of Mich.

[73] Assignee: Finite Filter Company, Madison Heights, Mich.

[21] Appl. No.: 658,222

[22] Filed: Feb. 17, 1976

Related U.S. Application Data

[62] Division of Ser. No. 593,831, July 17, 1975.

[51] Int. Cl.² .............................................. B01D 29/14
[52] U.S. Cl. .................................. 210/315; 210/490; 210/497 R; 210/505; 210/DIG. 5
[58] Field of Search ............ 156/330; 210/23 R, 314, 210/315, 317, 484, 489, 490, 491, 493 R, 497 R, DIG. 5, 505; 162/219, 220, 228

[56] References Cited

U.S. PATENT DOCUMENTS

| | | | |
|---|---|---|---|
| 2,146,749 | 2/1939 | Knight | 162/219 X |
| 2,395,301 | 2/1946 | Sloan | 210/DIG. 5 |
| 2,539,767 | 1/1951 | Anderson | 162/228 X |
| 2,700,326 | 1/1955 | Curtis | 162/228 |
| 2,911,101 | 11/1959 | Robinson | 210/DIG. 5 |
| 3,003,643 | 10/1961 | Thomas | 210/314 X |
| 3,061,107 | 10/1962 | Taylor | 210/DIG. 5 |
| 3,209,916 | 10/1965 | May et al. | 210/DIG. 5 |
| 3,450,632 | 6/1969 | Olson et al. | 210/DIG. 5 |
| 3,542,079 | 11/1970 | Kelly, Jr. | 156/330 X |
| 3,592,769 | 7/1971 | Decker | 210/491 |
| 3,594,273 | 7/1971 | Williams | 162/219 |
| 3,599,796 | 8/1971 | Wilhelm | 210/491 X |
| 3,606,735 | 9/1971 | Baigas, Jr. | 210/493 X |
| 3,767,054 | 10/1973 | Farrow et al. | 210/497 X |
| 3,931,019 | 1/1976 | Fowler | 210/DIG. 5 |
| 3,972,694 | 8/1976 | Head | 210/505 X |

*Primary Examiner*—Wilbur L. Bascomb, Jr.
*Assistant Examiner*—Robert H. Spitzer
*Attorney, Agent, or Firm*—Dolgorukov & Dolgorukov

[57] ABSTRACT

The specification discloses a novel composite coalescing filter tube and the method of making the same. In contrast to previous coalescing filters, which had layers of filter material sandwiched between relatively rigid support members, the present invention provides for a completely unitary coalescing filter tube wherein the various layers of the filter are successively vacuum formed one over the other on a forming fixture which is submerged in an appropriate glass fiber slurry mix, with the various layers being air dried, epoxy dipped, and cured as needed for the particular application. Since, during the vacuum forming process, glass fibers from one layer will interlock with glass fibers from the previously formed layer, a completely unitary coalescing filter tube is formed, preventing the problems of filter layer separation, channeling, pressure collapse and vibration damage which have occurred in past coalescing filters.

24 Claims, 16 Drawing Figures

COMPOSITE COALESCING FILTER TUBE

This application is a division of our co-pending patent application, Ser. No. 593,831, entitled "Composite Coalescing Filter Tube and Method of Manufacture Thereof" filed July 7, 1975.

The present invention relates to an improved composite filter coalescing tube which may be used in virtually any coalescing filter assembly, and more particularly, relates to a coalescing filter tube consisting of successively vacuum formed layers which by virtue of the vacuum forming process form a substantially unitary filter tube which eliminates substantially all the problems present in such coalescing filters in the prior art.

It has long been the practice in the art dealing with coalescing filters to provide a perforated rigid inner support, usually made out of metal, around which may be wrapped a layer of filter cloth, and then to wrap filter media around the rigid inner support, after which another layer of filter cloth may or may not be provided, and then to provide a perforated rigid outer support which again can be made of metal, and to hold this entire assembly between suitable end caps, and place a layer of foam over this assembly, with such layer usually being referred to as a drain layer.

In the past, this type of assembly may have the filter material either just resting between the inner and outer rigid supports, or it may be compressed between the rigid supports such as in the Patent to Dominick, U.S. Pat. No. 3,460,680. However, these filters had several serious problems which the art recognized. A serious problem was the fact that if the layers were compressed initially, there was no guarantee that they would remain so. Because of variations in the pressure drop, flow rate, or liquid loading, or even because of back pressure on the filter, a change in the dimensional stability and relative positioning of the filter media in relation to its original placement could take place. This would result in a reduction of overall filteration efficiency. If the filter media was not compressed at all, this would be even more a serious problem.

In addition to displacement of the filter media, if the filter was placed in a position where frequent back pressures could be encountered, because the filter media is a relatively fragile thing, and the support tubes of necessity had to be perforated and rigid, the rupturing of the filter media could occur with a result that some portions of the filter would perform no filtering function whatever, while other portions of the filter would be seriously overloaded.

These being serious problems in the art which could not remain unsolved for long, many attempts were made to provide a filter which would solve these problems. It appears that one of the main attempts was to eliminate the inner rigid support and replace it with an inner porous support which was flexible, so that back pressure would not cause a rupture of the filter. However, even filters of this construction, of which the U.S. Pat. No. 3,802,160 to Foltz appears to be an example, will still have the problems of separation between layers of the filter media, and displacement of the filter media itself, and it is even extremely doubtful whether the back pressure problem has been solved.

In addition, a new problem has very recently come to light in the area of coalescing filters, which none of the filters presently available can deal with. With the occurrence of the need for higher and higher air pressures from air compressors, there has come into wide use the rotary air compressor, which is designed to be lubricated with synthetic lubricants, and has a rather high air discharge temperature. It has been found that the foam drain layers, which have been used on substantially all previous coalescing filters, rapidly disintegrate under such conditions, rendering such previous filters completely ineffective. As will be disclosed below, Applicants have now even gone so far as to provide for the forming of a glass fiber drain layer over the other layers of the filter, which completely eliminates this problem.

Accordingly, one of the objects of the present invention is to provide an improved coalescing filter tube in which one or more layers of the same or different porosity are vacuum formed into a unitary coalescing filter.

Another object of the present invention is to provide a method of manufacturing a coalescing filter of the above described nature.

Another object of the present invention is to provide a coalescing filter wherein the inner support for the filter media is itself formed of glass fibers and thus, is capable of performing a pre-filtering function, as well as supporting the filter media.

Another object of the present invention is to provide a unitary filter having an inner pre-filter support layer, and an outer coalescing filter layer, which is supported by an outer rigid seamless support tube.

Another object of the present invention is to provide a unitary glass fiber coalescing filter which eliminates the problem of shifting of the filter media due to variations in pressure drop, flow rate, or liquid loading.

A still further object of the present invention is to provide a coalescing filter tube of the foregoing nature which by the virtue of vacuum forming of the layers provides for interlocking of the fibers between the various layers, and thus, prevents the problems of channeling between layers of the filter, provides additional strength to the filter itself, prevents damage to the filter due to flow or pressure fluctuations, and prevents layer separation.

A still further object of the present invention is to provide a glass fiber drain layer as the final layer of the coalescing filter tube.

Another object of the present invention is to provide a coalescing filter tube which is resistant to rupture due to back pressure and vibration in the filter environment.

Another object of the present invention is to provide a coalescing filter tube of the foregoing nature which may easily be installed as an original or replacement filter in commercially available coalescing filter assemblies.

Further objects and advantages of this invention will be apparent from the following description and appended claims, reference being had to the accompanying drawings forming a part of the specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Figures 5, 6:
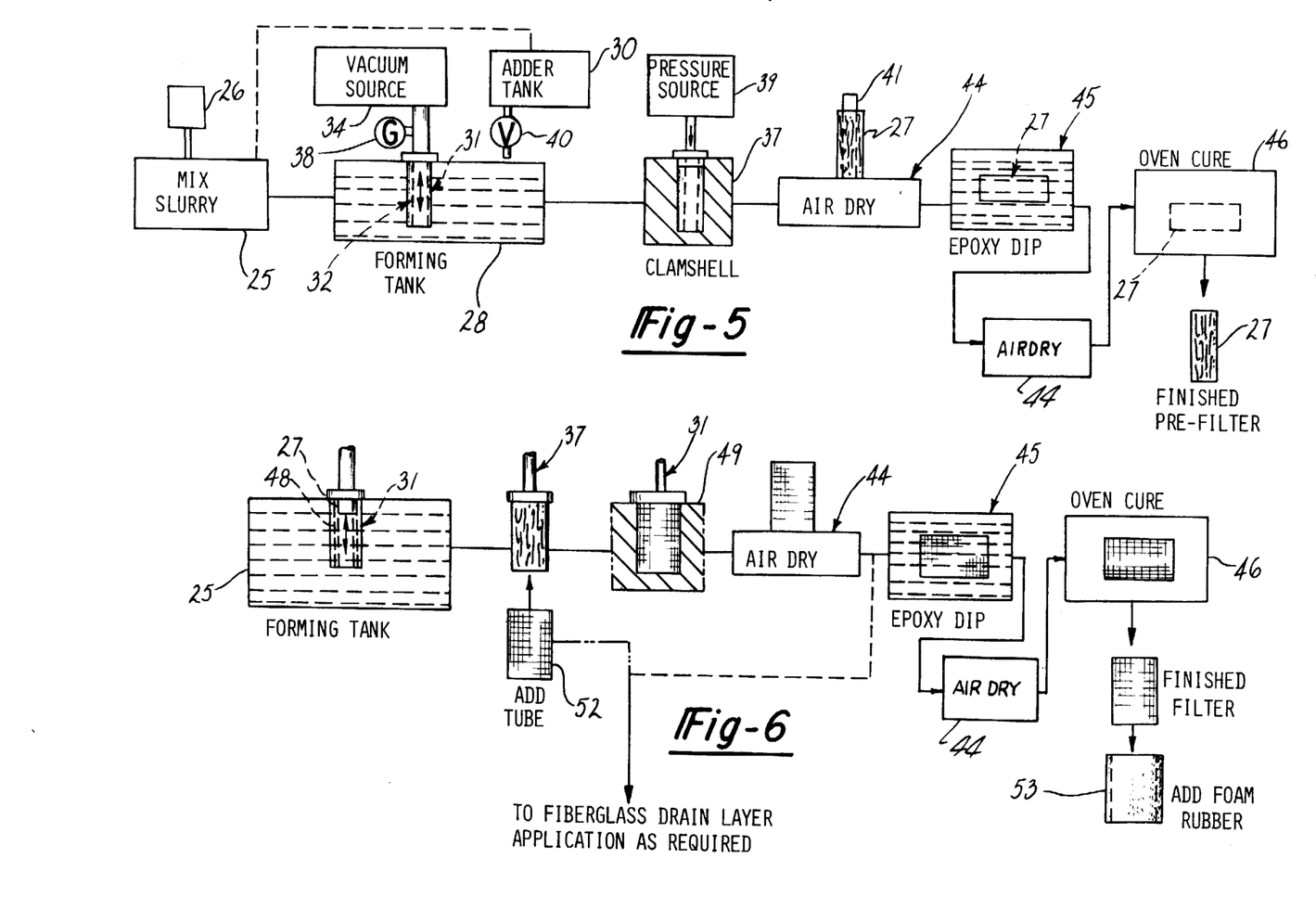
FIG. 5 is a diagrammatic view of the process used to manufacture a pre-filter support tube embodying the construction of the present invention.
FIG. 6 is a diagrammatic view of the process used to manufacture a composite filter coalescing tube embodying the construction of the present invention which may or may not start with the pre-filter support tube manufactured by the process shown in FIG. 5.

Referring to FIG. 5, the manufacture of the composite filter coalescing tube may begin with the manufacture of the pre-filter support layer. This, in turn, begins with the preparation of glass fiber slurry in the mixing tank 25.

The slurry of glass fibers, water and binder is prepared by first mixing bundles of commercial glass fibers in water with a high speed mixer 26 for about one half hour, so that the glass fibers will be of lengths of approximately one sixty-fourth to one-half inch in length.

The amount of glass fibers put into the water is sufficient when it forms a mixture of approximately 0.6% by weight of fibers in the water. For example, two pounds of glass fibers in forty gallons of water would provide such a mixture.

Although the duration of the mixing time will determine the length of the glass fibers, it has nothing to do with the filters pore structure, however, it will affect the smoothness of the outer wall of said filters.

It should be understood that the amount of glass fiber added to the water and emulsion binder mixture is not as important as the diameter of the glass fibers, since, the percentage of glass fibers in the water emulsion mixture can be as low as 0.1% or as high as 2.0% by weight, without affecting the pore size of the final glass fiber filter. It is the pore size of the glass fiber filter that determines the physical characteristics of the filter and this is controlled by adjusting the mix of the diameters of glass fibers that are added to the water and emulsion mixture.

Since several works are available in the art which give information on what mix of glass fiber diameters in a slurry will result in which pore sizes, it is not believed necessary to discuss this matter at length in the present application. However, for the purposes of disclosure, we wish to note that the article entitled "Aerosol filters-Pore size distribution in fibrous filters" by H. W. Piekarr and L. A. Clarenburg, published by the Chemical Laboratory of the National Defense Research Organization T.N.O., Rijswijk Z. H., the Netherlands, is particularly helpful in understanding how glass-fiber filters such as the present one operate, and is incorporated herein by reference.

At this point, it should be understood that the present invention is not limited to the use of glass fibers, but can be used with any other suitable filter material.

In a pre-filter 27 (see FIG. 8) the desired range of the pore size should be between forty microns and six microns absolute, for proper functioning and the preserving of the coalescing filter.

For example, a maximum pore size of 12 microns absolute can be obtained by adding equal parts of glass fibers of eight microns and two microns in diameter. This will make a twelve micron absolute (liquid absolute) pre-filter, which means nothing bigger than twelve microns will be able to pass through the pre-filter while in a liquid form.

The acceptable pore size range for the coalescing filter, however, should be between eight to four microns absolute and the choice of the desired size will depend on the viscosity, quantity and surface tension of the liquid you are coalescing.

For example, a pore size of eight microns absolute should be used with a large filter when you do not need the ultimate coalescing ability; while a six micron coalescing filter can be used to separate compressor oil from air in the two hundred to two p.p.m. range, and finally when the ultimate coalescing ability is required, a four micron coalescing filter will provide the necessary separation in the range of ten to less than one p.p.m.

The desired pore size in the coalescing filter can be obtained with a number of glass fiber mixture portions and varies greatly with the type and percentage by weight (relative to the glass fibers) of binder that is used.

For example, using a standard binder, at two percent by weight in relation to the glass fibers, the following portions of glass fibers would be needed for the indicated pore size of the filter, viz.

Four microns absolute
   16% of 0.5 micron diameter fibers
   62% of 1.0 micron diameter fibers
   22% of 2.0 micron diameter fibers
Six micron absolute
   60% of 1.0 micron diameter fibers
   40% of 2.0 micron diameter fibers
Eight microns absolute
   22% of 1.0 micron diameter fibers
   78% of 2.0 micron diameter fibers Therefore, it is obvious that the slurry mixture will vary greatly depending on the desired pore size of the filter to be formed.

Further, an emulsion binder is added to this water and glass fiber slurry, for the purpose of giving the processing and handling strength that is necessary in both the pre-filter and the coalescing filter prior to air drying.

The emulsion binders used can be either organic or inorganic but must be water soluble. There are hundreds of different types of binders available and the choice will depend on the use and the desired physical characteristics of the final composite filter coalescing tube.

For example, where flexibility is a desired physical characteristic, a latex acrylic binder may be used, or when a high strength and temperature resistant filter is required, a colloidal silica or phenyl formaldehyde binder may be used. When the filter is intended to be used for the processing of food and/or drugs, a melamine binder may be used. Again, it is important to emphasize that the slurry mixture will vary according to the desired pore size of the filter. The length of mixing time or the length of the glass fibers is not as important as the actual size (diameter) and composition of the glass fibers in the slurry mixture The size or shape of the mixing tank used to prepare the slurry is unlimited, although for convenience and practicality the smallest container possible would be used.

Once the slurry is prepared, it is diluted to about 0.15% to 0.20% of glass fibers by weight to the water before adding to the forming tank 28.

The reason for preparing the slurry in the concentrated form, and then diluting it before placement into the forming tank 28, is that the preparation of a concentrated slurry is more efficient, since the size of the mixing tank can be smaller. However, the use of such a concentrated slurry in the forming tank 28 would be impractical because the forming time for any given thickness of any particular layer of the filter would be very short, and the outside diameter of the formed layer would be very hard to control. Since the outside diameter of the formed layers is very important for the reasons to be described, the slurry is diluted, as mentioned above, before being place in the forming tank. Some of the slurry, for reasons to be described below, is diluted to approximately 0.30% glass fibers by weight, and placed in the adder tank 30.

Once the slurry is prepared and placed in the forming tank 28, and adder tank 30, the manufacturing of the composite filter coalescing tube may begin with the making of the pre-filter.

Figures 7, 8, 8A, 9, 10, 11:
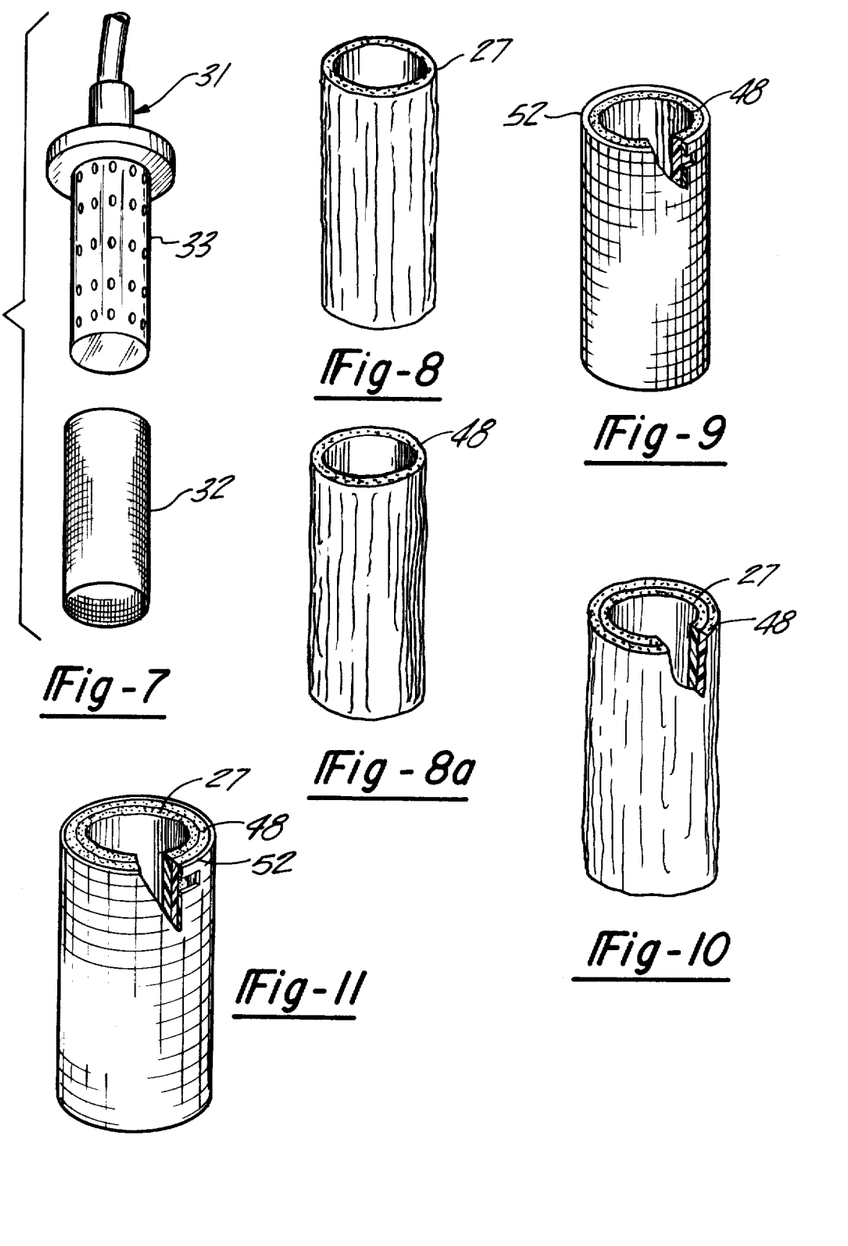
FIG. 7 is an exploded perspective view of the forming fixture having a brass screen of one hundred mesh size mounted thereon.
FIG. 8 is a perspective view of a pre-filter embodying the construction of the present invention.
FIG. 8A is a perspective view of a coalescing filter embodying the construction of the present invention.
FIG. 9 is a perspective view of a coalescing filter with a rigid retainer tube embodying the construction of the present invention.
FIG. 10 is a perspective view of a filter embodying the construction of the present invention and having pre-filter and coalescing filter layers.
FIG. 11 is a perspective view of a composite coalescing filter tube having pre-filter and coalescing filter layers supported by a rigid retainer tube, and embodying the construction of the present invention.

Referring to FIGS. 5-7, first, a forming fixture, generally designated by the numeral 31, and consisting of a brass one hundred mesh screen 32 around a rigid perforated tube 33 is lowered nto the forming tank 28. The screen is necessary to prevent the glass fibers from being pulled on through the forming fixture. A vacuum from the vacuum source 34, of seven to twenty-five inches Hg is applied to the fixture 40. While any vacuum from 7 inches to a total vacuum can be applied, Applicant has found that a vacuum of approximately 18 inches Hg is most satisfactory for forming the pre-filter.

The vacuum actually used will depend upon two factors, the desired speed at which the pre-filter is to be formed, and the size or shape of the forming tank 28. While the amount of vacuum obtainable will depend on the kind of equipment used, it is important that not too low vacuum be applied, since the smaller glass fibers will not have an opportunity to migrate to the inside of the pre-filter. The higher the vacuum that is applied, the faster the slurry will be pulled toward the forming fixture, with the smallest fibers moving the fastest.

Further, the size of the forming tank will also have an effect on the acceptable thickness of the slurry, since a small tank would require a thick slurry, while a large tank would require a thinner slurry, since there is a longer forming time available and, therefore, more effective control during the filter forming process.

The forming fixture 31 is left in the forming tank 28 until the vacuum gauge 38 shows a predetermined amount of resistance (vacuum) to the flow of the glass fibers has been reached. It should be understood that other method of regulation of the time the fixture is left in the slurry can be used, such as a straight time controlled interval, etc., but we have found the resistance to flow method to be one which gives a very satisfactory control of the outer diameter of the pre-filter, which is necessary for reasons to be explained.

The forming fixture 31 is then removed from the forming tank 28, with the part being allowed to partially dry under vacuum for a short time, the vacuum is stopped and a clamshell 37 is placed around the pre-filter 27. The clamshell 37 has a finished inner diameter of substantially the same size as the outer diameter of the pre-filter. With the pre-filter in the clamshell, a positive pressure from the source 39 may be applied to the interior of the forming fixture to aid in the removal of the pre-filter and clamshell from the forming screen 32.

The amount of positive pressure that is applied is not critical, but must be sufficient to cause the separation of the inside of the pre-filter from the screen 32. The amount of positive pressure which has by experience proven to be sufficient is ten p.s.i.

It is at this point that the outside diameter of the pre-filter, and the considerations in forming the pre-filter which have been mentioned previously, become critical. It can be seen that if the outer diameter of the pre-filter is not substantially the same as the inner diameter of the clamshell, the pre-filter may rupture when positive pressure is applied, ruining the pre-filter.

Once the forming screen 32 has been separated from the pre-filter 27, the slurry in the forming tank 28 can be replaced as necessary from the adder tank 30 by the control valve 40, and the processing of other pre-filters can continue.

The adder tank 30 is not necessary, but is preferably provided, as it is very desirable to keep the slurry in the forming tank 28, at a constant concentration to eliminate as many variables as possible which may affect the uniformity of the outer diameter of the pre-filter 27.

Note that the slurry in the adder tank 30 has already been diluted to about one half of the concentration of the glass fiber slurry in the mixing tank 25 for the convenience of the pre-filter and filter processing operations.

At this point, the clamshell 37 is removed from the formed pre-filter. If the pre-filter is being made for an application where geat accuracy is not required, the clamshell is simply removed. If, however, the intended application is a more demanding one, where the inside diameter and concentricity of the filter are important, the pre-filter, while still in the clamshell, is placed over a forming mandrel having an outside diameter slightly less than the inner diameter of the pre-filter layer, and then the clamshell is removed. With the mandrel not being removed until the finished product is cured, the concentricity and inside diameter of the filter will be accurate. It can be seen that the forming mandrel may be used whenever an accurate inside diameter of a concentric filter is required, and whether the inner layer of the filter is a pre-filter or coalescing filter.

The pre-filter will now be dryed. The exact drying time will vary widely depending on the temperature at which the drying operation takes place, as well as the velocity of the air passing over the pre-filter. However, a minimum drying temperature is necessary to turn the emulsion binder in the glass fiber slurry to a solid. It is obvious that this operation can be done many ways. Thus, no particular way of doing this is set out, and the entire operation is generally designated by the numeral 44.

Once the pre-filter is air dried, it will be placed into an epoxy dip 45, which is at room temperature, until it becomes saturated. The pre-filter is then removed from the epoxy dip and is once again air dried, this time to remove the solvents from the epoxy. This second air drying operation, whether it is done on the pre-filter, coalescing or drain layer of the filter is done at a slightly lower temperature, about 180° F, that the first air drying operation due to the flammability of the solvents in the epoxy.

The epoxy saturant is then oven cured to provide the necessary strength to permanently hold the pre-filter together. Any suitable epoxy can be used, depending on the particular use for which the filter is intended.

However, since commercial epoxies are made for paints, it will be necessary to thin them before being used. A suggested thinning range being between ten % and fifty % by weight in relation to the weight of the pre-filter. The standard practice in the art is to use a thinning ratio of twenty %.

The pre-filter is then placed into a curing oven 46 for approximately one half hour. The temperature used in the curing oven 46 will depend on both the type of epoxy binder and retainer tube 20 used (see below discussion as to the choice of a retainer tube when manufacturing a four layer composite filter coalesing tube). When a plastic retainer tube 20 is used, the oven curing should be at a temperature of about 200° F; when a metal retainer tube is used, the oven curing can be at a temperature of 280° F, and both should be cured for one half hour.

Once the oven curing has taken place, the processing of the pre-filter is completed, and the first of four possible layers of the composite filter tube is finished.

If the pre-filter is being used as the inner layer of the filter, the next step in the processing of the composite filter coalescing tube is to place the finished pre-filter tube back on the forming fixture 31 with the brass mesh screen 32 and then to form a glass fiber coalescing filter layer over the pre-filter using basically the same procedure as above described in the processing of the pre-filter, except as below modified.

Referring now to FIG. 6, the adding of the coalescing filter layer to the pre-filter tube 27 begins with the lowering of a second forming cylinder, which may be the same as the forming cylinder 31 used for the pre-filter, into the forming tank 28 which contains a specially prepared glass fiber slurry (see above discussion as to the composition of the desired slurry for the coalescing filter layer) that will produce the desired pore size required for the filter coalescing layer, and provide the intimate contact between the pre-filter and coalescing filter layers by the interlocking of the glass fibers between the layers. By virtue of the vacuum now being drawn through the pre-filter support layer 27 while the coalescing filter layer 48 is being formed the "fines" or glass fibers from the layer 15 will interact with the glass fibers from the layer 27 and will insure that there is intimate contact between the two layers. Such interacting will take place for a depth X depending on such factors as the vacuum applied, fiber diameters used, etc. It is by virtue of the interlocking of the two layers that the problems of channeling previously discussed cannot occur.

It is important while forming the coalescing layer 48 to control the wall size and the outer diameter of this layer as it is being formed on to the pre-filter to insure that the finished outside diameter is again close to the desired size. Otherwise in removing the two layers from the fixture 31 after the clamshell 49 is in place, as previously discussed, if there is too great a difference between the outside diameter of the filter and the inside diameter of the clamshell, the positive pressure applied will over-expand the filter layers causing the filter to fracture.

The factors which will control the wall size and outside diameter of the filter while in the forming tank 28 are the amount of glass fiber slurry placed on the pre-filter, the size of the tank, the amount of time that the pre-filter is left in the glass fiber slurry, and the amount of vacuum that is applied.

The suggested vacuum that should be applied in the processing of this phase of the filter, while in the forming tank 28, depends on the desired pore size of the coalescing filter and by experience has proven to be the following:

For a pore size of:
 8 microns — 20 inches Hg.
 6 microns — 21 inches Hg.
 4 microns — 22 inches Hg.

Note that the smaller the desired pore size of the coalescing filter, the higher the vacuum which will be needed, to provide a tighter fiber packing density.

After the coalescing filter layer 48 has been formed on to the pre-filter layer 27, the forming fixture 31 is removed from the forming tank, the part being allowed to dry under vacuum for a period of time. The vacuum is stopped and the clamshell 49 is placed around the filter. It should be understood that the pre-filter-coalescing filter combination formed at this point can also be used as a separate product, and if this is desired, the assembly is then put into the clamshell 49, the positive pressure is applied to remove the two layers from the forming fixture 31, with the resulting product air dried, epoxy dipped, again air dried, and then oven cured as in the previously described pre-filter process.

However, it has been found that due to the conditions found in actual use, such as air pressure surges and the like, it is very desirable to have a retaining tube placed over the prefilter-coalescing filter combination to add strength and rigidity.

If it is desired to add the rigid plastic or metal retaining tube over the filter layer 48, the rigid tube 52 is put over the filter layers 47, 48 before they are removed from the forming fixture 31. The rigid tube 52 now acts as the clamshell and the entire assembly may now be subjected to a positive pressure of fifteen pounds per square inch to force the coalescing filter layer 48 into the openings of the rigid tube retainer 52 and to force the pre-filter layer 27 away from the forming fixture 31. This process will provide interlocking contact between the rigid tube retainer 52 and the coalescing layer 48 of the filter. At this point, the additional slurry from an adder tank 30, such as used in the pre-filter process, can be added to the forming tank 28 to replace the glass fibers used in forming the coalescing layer 48 of the filter, and additional forming operations can take place while the remainder of the processes needed to produce a finished coalescing filter are taking place.

Next the assembly of the pre-filter, coalescing filter and the rigid tube retainer 52 is air dried 44 to remove the water put in the slurry and to solidify the emulsion binder. Again, the temperature used will vary, depending on whether the rigid tube retainer is plastice or metal. The suggested temperature for a plastic retainer is 240° F, and metal retainer is 300° F.

Upon completion of the air drying process, which as before is generally indicated by the numeral 44, the filter assembly is placed in the epoxy dip 45 (exactly the same as used for pre-filter) at room temperature until it becomes saturated, is then removed and again air dried. The epoxy saturant will provide the necessity strength to permanently hold the entire filter assembly together.

The saturated filter assembly is then placed into the curing oven 46 for approximately one half hour. The temperature used (which is the same as that used for the processing of the pre-filter, see above) will depend on the type of epoxy binder and rigid retainer tube used. Removing the finished composite filter coalescing tube from the oven 46 completes the process. The filter, at this point, will have one layer of epoxy on the coalescing layer, two layers of epoxy on the pre-filter, and an interlocked boundary layer between the pre-filter and coalescing filter, and also between the coalescing filter and the rigid tube retainer.

For very small filters, where the inside diameter of the filter does not permit you to form a pre-filter layer 27, it has been found desirable to substitute a rigid tube for the pre-filter layer. Also, it should be understood that the combination of the coalescing filter layer 48 and the outer rigid retaining tube 52 is also a very useable combination and is easily made by the method of the present invention. Referring to FIG. 6, such a coalescing filter-rigid tube assembly may be made by forming a coalescing layer 48 directly on the forming fixture 31, and then place the rigid tube 52 over this layer, with the other steps being as previously described for the pre-filter-coalescing filter, rigid tube assembly.

Figures 1, 2, 3, 4, 15:
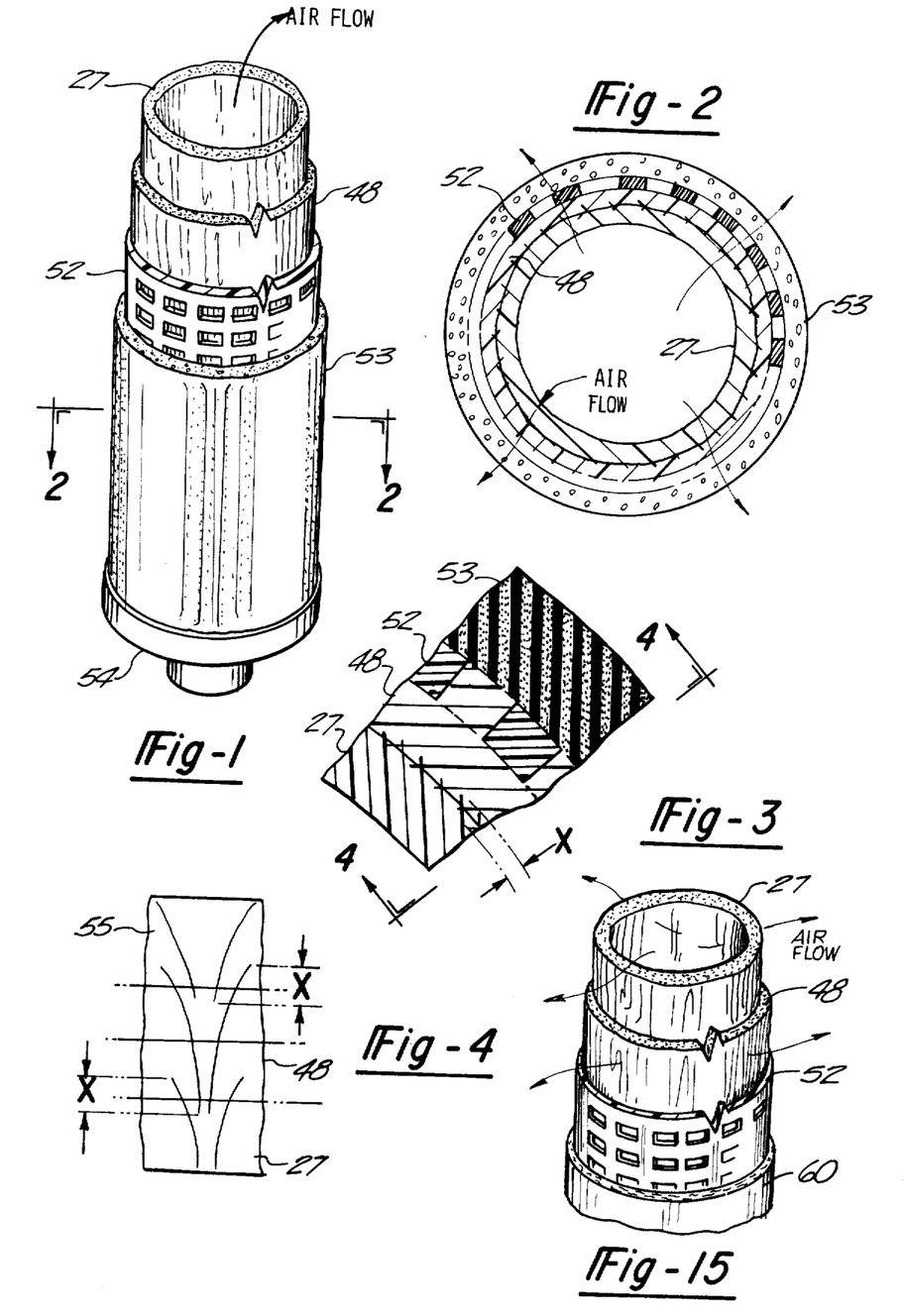
FIG. 1 is a cut-away perspective view showing a composite filter coalescing tube embodying the present invention, and having a pre-filter support layer, a coalescing filter layer, a rigid retainer tube, and a foam drain sleeve.
FIG. 2 is a sectional view of the composite filter coalescing tube taken in the direction of the arrows on the section 2—2 of FIG. 1, showing the intimate interlocking contact between filter layers.
FIG. 3 is a partial enlargement of the sectional view of the composite filter coalescing tube, showing the long glass fibers penetrating the pre-filter layer, and interlocking the rigid outer retainer tube in place.
FIG. 4 is a diagrammatic view of the composite filter coalescing tube showing the resulting relative pore sizes of the different filter layers, and having an outer glass fiber drain layer.
FIG. 15 is a perspective view of a filter embodying the construction of the present invention and having a pre-filter and coalescing filter layer surrounded by a rigid outer retaining tube and having a fiber felt drain sleeve surrounding said rigid retaining tube.
Figure 12:
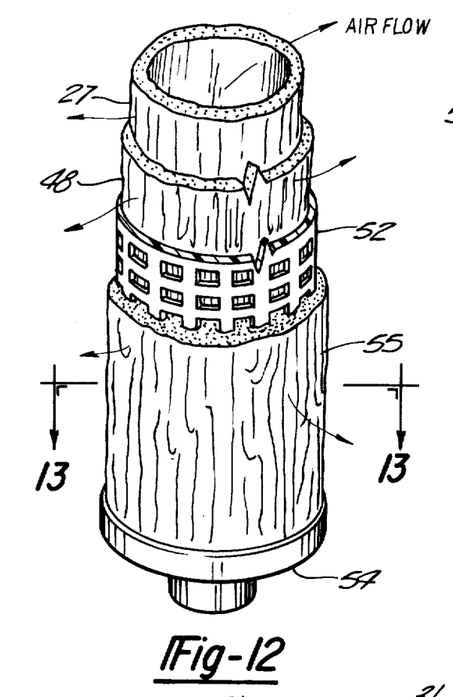
FIG. 12 is a cut-away perspective view showing a coalescing filter embodying the construction of the present invention and having a pre-filter support layer, a coalescing filter layer, a rigid plastic retainer, and a glass fiber drain layer, mounted in an end cap.
Figure 13:
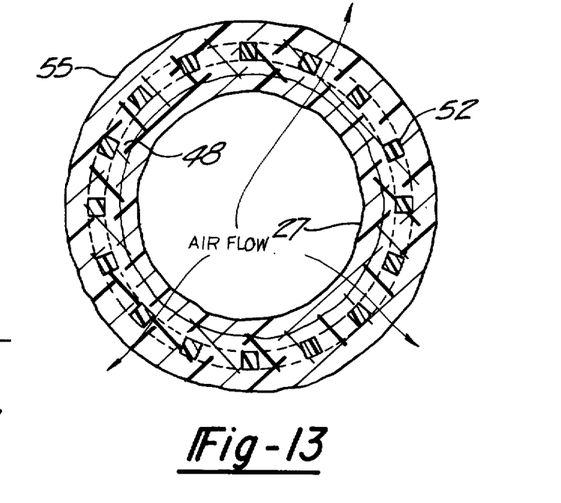
FIG. 13 is a sectional view taken in the direction of the arrows on the section line 13—13 of FIG. 12 and showing how the drain layer interlocks with the retainer tube.

Finally, if a fourth layer on the finished filter is desired for the purpose of providing a porous run-off sleeve, a foam rubber tube 53 can be added by simply sliding the desired run-off sleeve into a fixture to expand it, then sliding it over the completed composite filter coalescing tube assembly. The completed composite filter coalescing tube can then be cut to the desired length and capped on the ends with end caps 54 such as shown in FIGS. 1 and 12, as required for its application.

Where low temperatures or non-corrosive environments are found, the foam rubber drain sleeve 53 has been found to be satisfactory. However, with more and more compressed air supplies being produced by rotary air compressors, with high operating temperatures, and large amounts of synthetic oil discharge in the air, it has been found that the foam rubber sleeves, when placed close to the air source, will tend to decompose, and thus, give unsatisfactory results. In order to solve this problem, Applicant has found that the forming of a third course fiber glass drain layer 55 over the rigid support tube 52 gives very satisfactory results. In order to form the glass fiber drain layer 55 over the rigid support tube 52, a third forming operation is needed.

Figure 14:
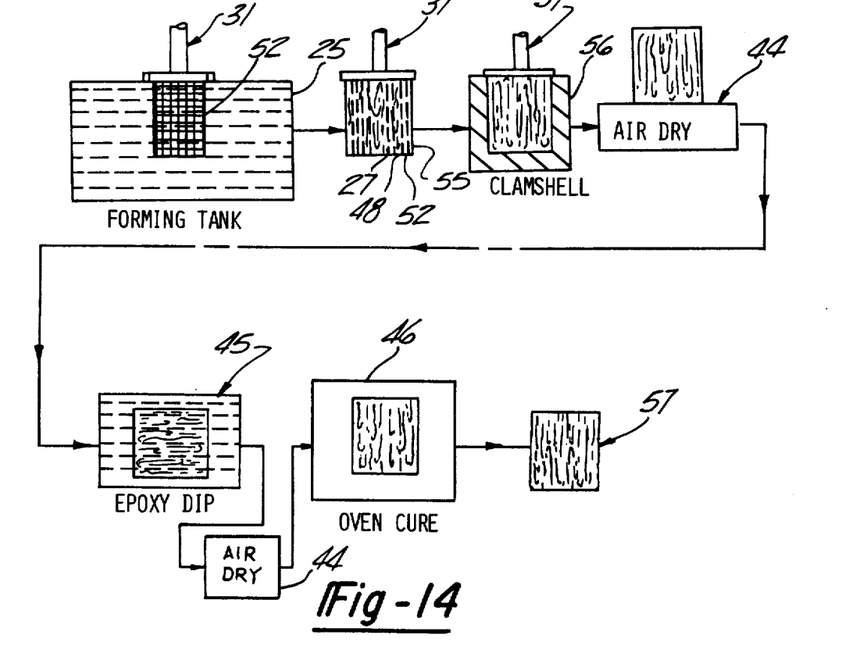
FIG. 14 is a diagrammatic view of the additional processes necessary to add the fiber glass drain layer over the plastic retaining tube shown in FIG. 12.

Referring to FIGS. 6 and 14, the addition of the glass fiber drain layer may start at two points of the process shown in FIG. 6. You may either add the rigid retaining tube 52 and place the forming fixture containing the coalescing filter, which may or may not contain the inner pre-filter, and the rigid retainer tube back in the forming tank 28, or you may continue the process shown in FIG. 6 past this stage and just apply the rigid retainer tube 52, and then apply the positive pressure, if desired, to separate the three layer assembly from the forming fixture 31 and then air dry this assembly, similarly to that described. Regardless of which of these two initial steps is taken referring to FIG. 14, the filter assembly consisting of the coalescing filter layer 48, which may or may not contain the inner pre-filter support layer 27, and the rigid plastic or metal retaining tube 52 is placed back over the forming fixture 31 and it is lowered into the forming tank 28 containing an appropriate slurry mixture. Applicant has found that the slurry mixture for the drain layer 55 may be identical to the slurry used for the pre-filter layer 27, and thus, in FIG. 14, the forming tank therein illustrated may be the same as the forming tank 28 in FIG. 5. A sufficient vacuum is applied for a predetermined time to form a drain layer 55 of the desired thickness, after which the forming fixture 31 is removed from the tank 28, the filter assembly is allowed to partially dry under vacuum for a period of time, the vacuum is shut off. At this time, similar to the steps previously described, the clamshell 56, which must now be of a new larger diameter to accommodate the drain layer, is placed over the forming fixture and filter assembly, at which time the filter assembly is extracted from the forming fixture. A positive pressure is applied to separate the filter-drain layer combination from the forming fixture 31, if desired.

Also similar to that previously described, the filter with the drain layer is now allowed to air dry 44 to allow the binder in the slurry mix to turn from a liquid to a solid, and give the drain layer sufficient strength for further working. It is then dipped in the epoxy 45 in the manner previously described and again allowed to air dry. It is then cured in the oven 46, at which time the four-layer coalescing filter 57 will be completed. At this time, end caps 54, as shown in FIG. 12, may be applied, and the entire assembly installed in the standard air filter apparatus.

A second solution to the synthetic oil compatability problem is to provide a synthetic fiber felt layer 60 in place of the glass fiber drain layer 55, previously described. Such a felt layer could be made of poly-propylene, nylon, polyesters or others. Such a layer may be applied by wrapping the felt around the rigid retainer tube 52 and then heat sealing or adhesive bonding. Such a construction is shown in FIG. 15.

It can be seen from the preceding description that not only is our new coalescing filter unique, but that our filter making process is unique also, and can make all the filter varieties disclosed herein, and more. For example, a pre-filter support tube may be had as a separate product, or a coalescing filter, with either a pre-filter support layer or a rigid support tube may be had, and this filter, in turn, may have a rigid outer support tube with either a foam, synthetic felt, or glass fiber drain layer.

Thus, by abandoning the previous construction of coalescing filters in which a metal support sleeve was wrapped with a filter medium and an actual retaining sleeve was used, and going to a unitary fiter construction wherein several layers of epoxy bound glass fibers are used to form a unitary construction, the objects of the present invention listed above and numerous additional advantages are attained.

We claim:

1. A vacuum formed highly porous pre-filter support tube formed of randomly oriented glass fibers being bound together by a cured epoxy binder and having a perforated rigid retaining tube surrounding the porous pre-filter support layer, and being in intimate interlocking contact therewith at all points of contact along the boundary between said rigid support tube and said pre-filter support tube.

2. A vacuum formed unitary highly porous composite coalescing filter tube comprising a porous inner pre-filter support tube formed of randomly oriented glass fibers surrounded by an outer porous filter coalescing tube, also formed of randomly oriented glass fibers and being in intimate interlocking contact with said porous pre-filter layer at all points of contact therewith.

3. The coalescing filter described in claim 2, wherein the inner pre-filter support layer consists of epoxy bonded glass fibers forming a filter having a pore size of from 6 to 40 microns absolute, and the outer filter coalescing layer comprising glass fibers forming a filter having a pore size of from 4 to 8 microns absolute, with said inner and outer intimate layers being saturated and bound with an epoxy binder.

4. The composite coalescing filter tube described in claim 3, wherein the glass fibers of the outer coalescing filter layer are in intimate interlocking contact with the fibers of the pre-filter support layer at all points of contact along the boundary between said coalescing and said pre-filter layers to form a unitary filter construction.

5. The filter described in claim 4, wherein the saturant is of an epoxy modified phenolic type.

6. The coalescing filter described in claim 5, and including a rigid perforated metal retaining tube surrounding the coalescing filter layer and being in intimate interlocking contact with said coalescing filter layer at all points of contact along the boundary between said filter layer and said metal retaining tube.

7. The coalescing filter described in claim 6, and including a porous foam sleeve over the rigid perforated metal retaining tube.

8. The coalescing filter described in claim 6, and including a fiber felt drain layer over the rigid perforated metal retaining tube.

9. The coalescing filter described in claim 6, and including an epoxy bonded glass fiber drain layer applied over the rigid perforated metal retaining tube.

10. The coalescing filter described in claim 4, and including a rigid, unitary, seamless, perforated plastic retaining tube surrounding the coalescing filter layer of said coalescing filter and being in intimate interlocking contact with said coalescing filter layer at all points of contact along the boundary between said filter layer and said plastic retaining tube.

11. The coalescing filter described in claim 10, and including a porous foam sleeve applied over the rigid plastic retaining tube.

12. The coalescing filter described in claim 10, and including an epoxy bonded glass fiber drain layer applied over the rigid perforated plastic retaining tube.

13. The coalescing filter described in claim 10, and including a fiber felt drain layer over the rigid outer perforated plastic retaining tube.

14. The coalescing filter described in claim 10, and including a glass fiber felt drain layer wrapped about the rigid outer retaining tube.

15. A porous coalescing filter tube formed of randomly oriented glass fibers being bound together by a cured epoxy resin, and including a rigid, unitary, seamless, perforated plastic retaining tube surrounding the coalescing filter and being in intimate interlocking contact with said coalescing filter at all points of contact along the boundary between said retaining tube and said coalescing filter tube.

16. The coalescing filter described in claim 15, and including a porous foam sleeve applied over the rigid plastic retaining tube.

17. The coalescing filter described in claim 15, and including an epoxy bonded glass fiber drain layer applied over the rigid perforated plastic retaining tube.

18. The coalescing filter described in claim 15, and including a fiber felt drain layer over the rigid outer perforated plastic retaining tube.

19. The coalescing filter described in claim 15, and including a glass fiber felt drain layer wrapped about the rigid outer perforated retaining tube.

20. A coalescing filter tube formed of randomly oriented glass fibers being bound together by a cured epoxy resin, and including a rigid perforated metal retaining tube surrounding the outer coalescing filter layer and being in intimate interlocking contact with said coalescing filter layer at all points of contact along the boundary between said metal retaining tube and said filter layer.

21. The coalescing filter described in claim 20, and including a porous foam sleeve over the rigid perforated metal retaining tube.

22. The coalescing filter described in claim 20, and including a fiber felt drain layer over the rigid perforated metal retaining tube.

23. The coalescing filter described in claim 20, and including a glass fiber felt drain layer wrapped about the rigid outer perforated retaining tube.

24. A coalescing filter comprising a composite coalescing filter tube as described in claim 2, and including means for introducing the fluid to be filtered to the interior of said composite coalescing filter tube at the inside of the innermost filter layer in such a manner that such fluid will flow through the remaining layers of said filter, wherein said composite coalescing filter tube has its ends substantially closed by a pair of closure members and is mounted inside a suitable filter housing having inlet means sealingly communicating with the interior of said filter and outlet means communicating with the atmosphere.

* * * * *